April 23, 1935.  G. SCHENK  1,998,592
SPRAYING DEVICE
Filed Oct. 26, 1933
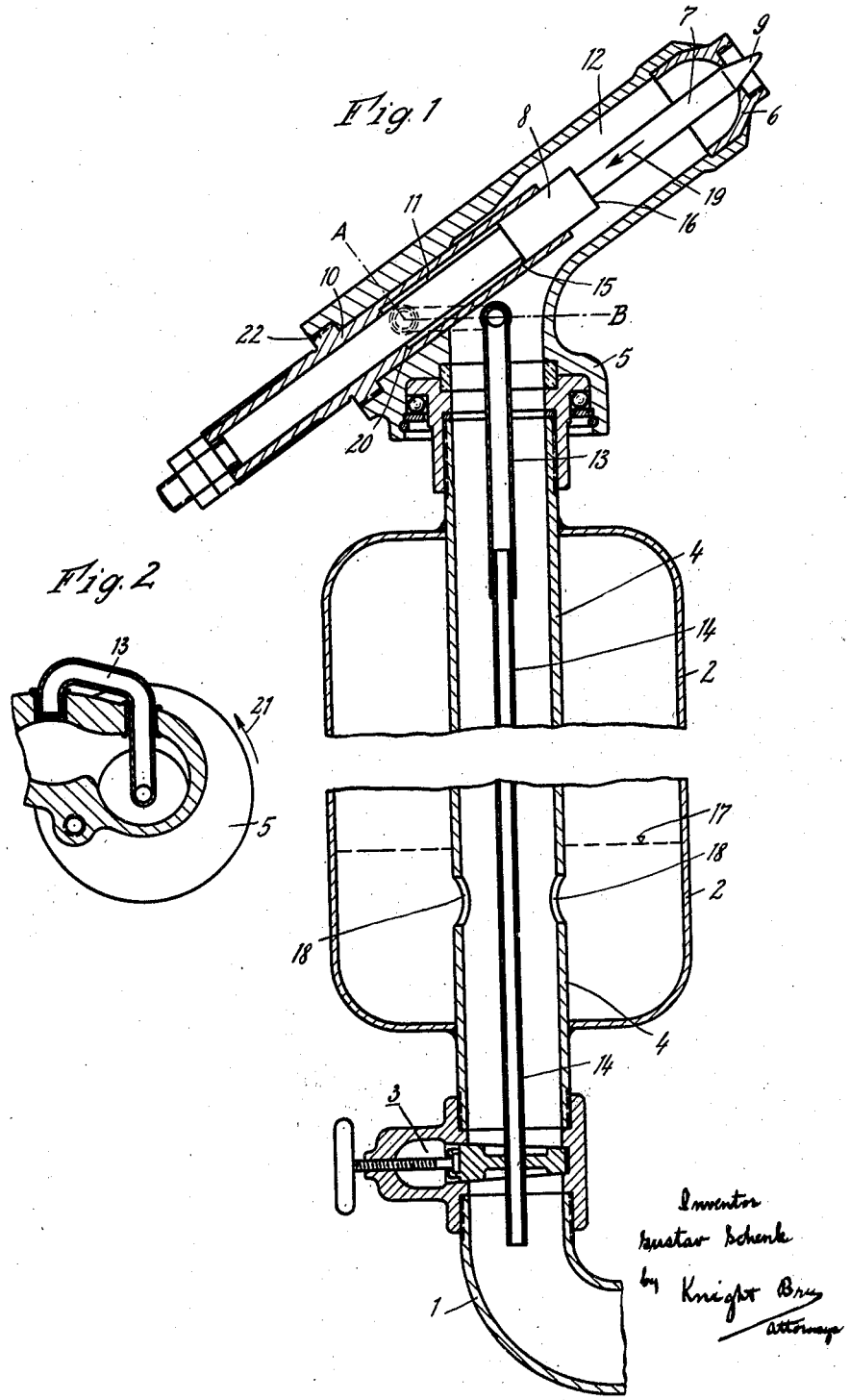

Patented Apr. 23, 1935

1,998,592

UNITED STATES PATENT OFFICE 1,998,592

SPRAYING DEVICE

Gustav Schenk, Berlin-Spandau/Hakenfelde, Germany, assignor to Siemens-Schuckertwerke Aktiengesellschaft, Berlin-Siemensstadt, Germany, a corporation of Germany Application October 26, 1933, Serial No. 695,307
In Germany October 29, 1932

6 Claims. (Cl. 299—25)

My invention relates to improvements in spraying devices, and more particularly to a sprayer control for a periodical water delivery.

Spraying devices have already been proposed, in which the jet is periodically interrupted, the devices being associated with an air chamber which contains the quantity of water required for irrigation. The individual watering operations are controlled by a pressure-responsive member arranged between the air chamber and the outlet opening of the spraying nozzle. In the spraying devices hitherto employed, the pressure-responsive member was held in the closed position by a spring-biased device, whereas the opening of the pressure-responsive member was effected in accordance with the pressure prevailing in the air chamber.

The object of my invention is to provide a spraying device of improved construction wherein the pressure-responsive member which controls the opening and closing of a discharge outlet for the nozzle, is operated by counteracting pressures from within pressure-medium chambers within said nozzle, one of said pressure-medium chambers being connected up with a portion of the supply pipe leading to a pressure-accumulator chamber and the other of said pressure-medium chambers (nozzle outlet chamber) being connected up to a continuation of the supply pipe leading from said accumulator chamber. By means of this construction, the mechanical means hitherto employed for controlling the pressure-responsive member such, for example, as those shown and described in the copending application of Wilm Kind et al. Serial No. 584,142 filed December 31, 1931, may be dispensed with.

In the accompanying drawing an embodiment of my invention is illustrated in a diagrammatic form.

Fig. 1 shows a vetrical sectional view of a spraying device embodying my invention with a portion of the air chamber broken off, and Fig. 2 is a sectional view thereof taken on the line A—B of Fig. 1.

Referring to Fig. 1, a water-supply pipe 1, in which a gate valve 3 is arranged, is connected to an air chamber 2. A nozzle pipe 5 is rotatably mounted on an upright tube 4, and has an outlet 6 designed as a nozzle, the outlet being closed by a needle 7. The needle or plunger 7 is provided with a conical end or closure 9 and an enlargement or piston 8 which reciprocates in a bushing 10 secured to the nozzle pipe 5 by the threaded portion 22. The enlargement or piston 8 separates the space or pressure-medium chamber 11 from the space 12 which forms the outlet chamber of the nozzle pipe 5. The space 11 communicates with a conduit 14 through a conduit 13, the conduit 14 projecting through the gate valve 3 into the water-supply pipe 1. As will be seen from Fig. 1 the annular surface 16 is larger than the annular surface 15. The gate valve 3 is so designed as to permit the passage of a greater or smaller amount of water. The conduit 14 which passes through the gate valve 3 follows the movement of the gate valve 3.

Assuming that the water level in air chamber 2 is shown by the dotted line 17 when the gate valve 3 is closed, the pressure of the water in supply pipe 1, is transmitted through conduit 14 and conduit 13 to chamber 11 for holding the plug 9 in closed position. As soon as the gate valve 3 is opened the liquid passes into the air chamber 2 through ports 18 so that the water level rises. Consequently, by the increase of pressure in the air chamber 2, the fluid pressure in the space 12 of the nozzle pipe 5 is also increased until the pressure acting on the annular surface 16 exceeds that exerted on the annular surface 15. The spraying device operates as follows.

With the gate valve 3 opened to any desired extent, when the discharge of liquid through nozzle outlet 6 is shut off by the cone plug 9, the pressure of the air in accumulator chamber 2 is increased gradually by the inflow of liquid. As the pressure continues to rise, the piston 8 becomes responsive to the rising pressure on annular surface 16 and overcomes the pressure of the pressure-medium acting on the annular surface 15 whereupon the cone plug 9 is retracted into the outlet chamber 12 where the conical surface of plug 9 becomes exposed to the pressure medium or water therein. In consequence, as the liquid begins to discharge through the outlet 6, pressure is developed upon the forward surface of the cone plug 9 which suddenly and very considerably increases the effect of the pressure acting in the direction of arrow 19. As a result, the piston 8 snaps rearwardly and produces a sudden impact of annular shoulder 15 upon the annular shoulder 20. With an accelerated discharge of the liquid through nozzle outlet 6, the pressure in outlet chamber 12 drops and thus permits a closing movement of the cone plug 9 under the preponderating pressure in chamber 11. This action is repeated as long as the sprayer is in operation. By adjusting the opening at gate valve 3, the suddenness as well as the frequency of the nozzle opening operations may be varied at will. At the same time, the amount of liquid discharged at each opening of the nozzle may be varied while at the same time the reactionary effects of the repeated discharges which rotate the sprayer head will produce larger or smaller rotary movements of the sprayer depending upon the amounts and velocities of successive discharges.

By the expulsion of a given amount of water the pressure in the air chamber 2 as well as that in the nozzle pipe 5 decreases, thus causing the fluid to flow from the water-supply pipe 1 through the conduits 14 and 13 into the space 11, so that now the needle is shifted in the direction opposite to the direction of the arrow 19 and closes the nozzle pipe 5. The operation is then repeated in the manner as above described.

Since the nozzle pipe 5 is eccentrically arranged with respect to its axis of rotation, the blow occurring when the surface 15 strikes the surface 20 is utilized to cause a rotation of the spraying device in the direction of the arrow 21.

Besides, it is possible to design the surfaces 15 and 16 of the needle with an equal area and to employ an additional annular surface to the surface 16 or to utilize a portion of the needle point 9 so as to produce a force acting in the direction of the arrow 19.

The ratio between the surfaces of the pressure-responsive member exposed to the pressure prevailing in the water-supply pipe and in the air chamber is a measure for the difference between the pressure required for closing the nozzle pipe and that for opening the same. By differentiating the annular surfaces it is possible to increase the opening pressure to approximately the value of the pressure prevailing in the water-supply pipe and to obtain in this manner a very good utilization of pressure. Under circumstances, it may also be convenient to choose an opening pressure lying somewhat below the water-supply pipe pressure.

By inserting a throttling device in the water-supply conduit, it is possible to control at will the periodical water delivery.

The quantity of water supplied to the air chamber 2 may be controlled per unit of time by means of the gate valve 3. The time during which the air chamber is charged may be varied by adjusting the gate valve 3 so that the periodical water delivery may be increased or diminished. By the adjustment of the gate valve also the number of jets per unit of time is, consequently, controlled as well as the quantity of water for watering purposes.

I claim as my invention:

1. A spraying device of the character described, said spraying device comprising a nozzle pipe provided with a discharge outlet, a pressure medium supply pipe provided with a pressure accumulator chamber in open communication with said supply pipe, a closure movable into and out of position to close said discharge outlet, and pressure-responsive means connected to said closure, said pressure-responsive means being constructed and located to be operated in one direction by pressure medium in said nozzle pipe for moving said closure to open position and having a pressure-medium connection with said supply pipe anterior to said pressure-accumulator chamber for moving said closure to closed position.

2. A spraying device of the character described, said spraying device comprising a pressure-medium supply pipe, a nozzle pipe provided with a discharge outlet connected to said supply pipe, a pressure-accumulator chamber constructed and arranged to discharge intermittently into said nozzle pipe, a closure movable into and out of position to completely close said discharge outlet, said nozzle pipe being provided with a pressure-medium chamber in communication with said pressure-accumulator chamber and a second pressure-medium chamber separately connected to said supply pipe, at a point anterior to said accumulator chamber, and pressure-responsive means constructed and located to be acted upon by the pressure medium in one of said pressure-medium chambers in alternation with the pressure medium in the other of said pressure-medium chambers, said pressure-responsive means being connected to said closure for alternately opening and closing said closure.

3. A spraying device of the character described, said spraying device comprising a nozzle provided with an outlet chamber and a discharge outlet leading from said outlet chamber, a supply pipe connected to said nozzle, said supply pipe being provided with a pressure-accumulator chamber constructed and located to discharge intermittently into said supply pipe, a closure for said discharge outlet, said nozzle being provided with a pressure chamber, a piston connected to said closure and exposed at opposite ends to fluid pressure in said outlet chamber and pressure chamber respectively, and a pipe connection extending between said pressure chamber and a part of said supply pipe anterior to said pressure accumulator.

4. A spraying device of the character described, said spraying device comprising a nozzle provided with an outlet chamber having a discharge outlet and with a pressure-medium chamber coaxially arranged with respect to said discharge outlet, a supply pipe provided with an air chamber constructed and located to discharge intermittently into said supply pipe, said supply pipe being connected to said nozzle, a closure for said discharge outlet, a piston interposed between said chambers and operated by counteracting pressures in said chambers, said piston being connected to said closure, and means for connecting said pressure-medium chamber to said supply pipe at a point anterior to said air chamber.

5. A spraying device of the character claimed in claim 4, in which said nozzle is rotatably mounted on the upper end of a vertical supply pipe, the inner wall of said pressure medium chamber being provided with an abutment for intercepting the closure-opening movement of the piston.

6. In a spraying device of the character described, the combination of a stationary supply pipe arranged vertically and provided with an air chamber constructed and located to discharge intermittently into said supply pipe, a transversely-movable gate valve for said supply pipe arranged anteriorly of said air chamber, a nozzle rotatably mounted on the upper end of said supply pipe and provided with a discharge outlet, a closure for said discharge outlet, said nozzle being provided with an outlet chamber leading to said discharge outlet and a pressure-medium chamber, a pressure-responsive member interposed between said chambers, said pressure-responsive member being constructed and arranged to be displaced in one direction or the other by the counteracting pressures in said chambers, a pipe section connected to said pressure-medium chamber and rotating with said nozzle, said pipe section being arranged to depend into the upper end of said supply pipe, another pipe section rotatably engaging the first-mentioned pipe section and extending through said gate valve, the last-mentioned pipe-section being open at its lower end within said supply pipe.

GUSTAV SCHENK.